Patented Dec. 26, 1922.

1,440,211

UNITED STATES PATENT OFFICE.

CAMILLE DEGUIDE, OF ENGHIEN, FRANCE.

CONTINUOUS PROCESS FOR THE MANUFACTURE OF CAUSTIC SODA OR CAUSTIC POTASH.

No Drawing.   Application filed December 24, 1921.   Serial No. 524,696.

*To all whom it may concern:*

Be it known that I, CAMILLE DEGUIDE, a subject of the King of Belgium, and a resident of Enghien, Seine et Oise, France, have invented new and useful Improvements in a Continuous Process for the Manufacture of Caustic Soda or Caustic Potash, of which the following is a specification.

This invention relates to the manufacture of caustic soda or caustic potash.

In my pending application for patent lodged herewith No. 524,695 for "Process for the manufacture of alkali-metal silicates," there is described a manner of operation which consists in decomposing a silicate of barium by water and an alkali-metal sulphate.

I have found that by employing the reagents in suitable proportions, it is possible to utilize this same reaction for the production of caustic alkali, starting from bibarytic or tribarytic silicate or an intermediate silicate.

The silicate of barium, in a very finely divided state, is placed in suspension in water containing in solution the alkali-metal sulphate, and the temperature is raised to about 80° C. One of the following reactions takes place:

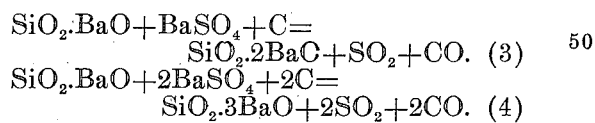

Similar reactions take place for the formation of caustic potash.

There are thus obtained two or four molecular proportions of caustic alkali, according as the bibarytic or the tribarytic silicate is employed.

It is easy to regenerate the original substances by means of the products resulting from the reaction; it suffices to calcine, in presence of carbon, at a temperature of about 1400° C. in a rotary or tunnel furnace, the mixture of barium silicate and sulphate obtained by the reaction which yields the caustic alkali:—

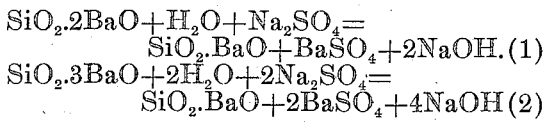

In this way a complete cycle of operations is produced.

In the following claims the expression "a barium polybasic silicate" is used to include a bibarytic silicate, and/or a barium silicate more basic than the bibarytic silicate—that is to say a tribarytic silicate, and/or a silicate intermediate between the bi- and tribarytic silicates. Similarly the expression "caustic alkali" is used to designate caustic potash or soda.

Having now particularly described and ascertained the nature of my said invention and in what manner the same is to be performed, I declare that what I claim is:—

1. A process for the production of caustic alkali, consisting in decomposing a barium poly-basic silicate by water and an alkali-metal sulphate.

2. A process for the production of caustic soda or caustic potash, consisting in decomposing a barium poly-basic silicate by water and an alkali-metal sulphate, and regenerating silicate by calcining, in presence of carbon, the mixture of mono-barytic silicate and sulphate obtained by the reaction which yields the caustic alkali.

In testimony whereof I have signed my name to this specification.

CAMILLE DEGUIDE.

Witnesses:
J. ARMENGAUD,
W. DEFÉVRIMONT.